Dec. 28, 1954  A. B. SOWTER  2,697,954
METHOD OF COLD PRESSURE WELDING
Filed Aug. 1, 1950

INVENTOR
ANTHONY BAGNOLD SOWTER
BY
ATTORNEY 2,697,954
Patented Dec. 28, 1954

2,697,954
METHOD OF COLD PRESSURE WELDING

Anthony B. Sowter, Wembley, England, assignor to The General Electric Company Limited, London, England Application August 1, 1950, Serial No. 176,936

Claims priority, application Great Britain August 5, 1949

4 Claims. (Cl. 78—94)

The present invention relates to cold pressure welding, that is, welding solely by pressure and without the supply of any substantial amount of external heat, more particularly, to a novel method of and means for welding together pieces of copper, aluminum or other non-ferrous and ductile metals or metal alloys.

According to known methods of cold pressure welding, the surfaces of the parts to be welded, after having been cleaned, such as by scratch-brushing, to produce metallic surfaces uncontaminated by matter foreign to the metal, are placed in face-to-face relation, whereupon pressure is applied to the contacting surfaces to be joined, to cause the metal of the surfaces to cold flow into intimate contact and to thereby produce a solid phase cold weld bond at the area to be welded.

More particularly, a method of welding together the aligned edge surfaces of two strips, plates, flanges or similar pieces of metal capable of being cold pressure welded has been proposed which comprises applying pressure to said pieces along a continuous line or strip-like area by means of suitable tools or dies with only a partial reduction in thickness of the two strips or the like. Given a proper design of the shape and dimensions of the dies and a proper control of the pressure applied, to result in a definite minimum percentage reduction of the total work thickness (about 70% in case of aluminum and 86% in case of copper) or deformation of the material at the welded area, efficient and mechanically strong cold weld joints can be produced in a relatively simple manner.

In the specification accompanying my co-pending patent application Serial No. 43,096, filed August 7, 1948, entitled Cold Welding of Metal, now Patent No. 2,639,633, there is described means for welding together the meeting edges of two superposed strips, flanges, plates or similar members of metal or metals capable of being cold welded, comprising a tool or tools having or each having a strip-like welding surface which is substantially flat in the direction of the interface or flow of the metal at welding, the cold weld being produced with a partial reduction in the thickness of the marginal areas of the two strips, flanges or the like. Further, in order to shear or part off excess metal laterally of the weld, it is proposed to use tool means operating laterally of the welding tool means and both tool means may be combined.

In one example for welding the adjacent flanges on tubing, it is suggested that rolls having both a cylindrical welding surface and a projecting flange, somewhat in the fashion of a railway wheel, may be used, the flanges effecting shearing or parting off and the flat welding surfaces of the two rolls being parallel to one another at the place where welding takes place.

Among the objects of the present invention is the provision of novel means for and a method of welding together the aligned edges of a pair of superposed strip-like metal parts such as sheets, plates, flanges, etc., by cold pressure welding, which results in a minimum height of the weld projecting from the edges of said members; which results in increased bending strength of the welded members transverse to the welding strip or area; and which is both simple in construction and reliable and economical in operation.

It has been found that, while it may still be desirable to provide the rolls with flat welding surfaces, it is not essential that at the place of welding they should be parallel to one another and, in fact, it has been discovered that successful welding and shearing or parting off of the flanges of tubing or other superposed metallic members may be effected by pressure rolls whose surfaces are flat but at a substantial angle to each other. Thus, the surface of each welding roll may be chamfered and the welding roll edges may meet to effect shearing or parting off.

According to the present invention, therefore, at the place where the cooperating tools engage material to produce a cold pressure weld, their strip-like welding surfaces are substantially flat in the general direction of flow of metal at welding but the surfaces are inclined to one another by an angle determined by the dimensions and weldability of the material to be welded. The edges of the welding surfaces of the tools may meet so that a section through the place of welding at the end of the welding operation is of V-shape.

It is not necessary that both tools shall have chamfered welding surfaces. One tool only need have such a surface. Further, the invention may be applied in the case of pressure rolls but may also be applied in the case of tools which have straight strip-like welding surfaces as opposed to circular welding surfaces of rolls.

The invention will become more apparent from the following detailed description considered in conjunction with the accompanying drawing, forming part of this specification and in which.

Like reference characters identify like parts in the different views of the drawing.

Figure 1:
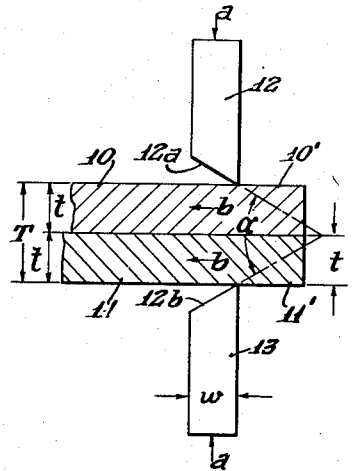
Figure 1 illustrates diagrammatically a tool arrangement, shown at the start of the welding operation, for joining the meeting edges of a pair of superposed sheet-like metal parts, such as plates, strips, flanges, or the like, in accordance with the invention.

Referring to Figure 1, there are shown a pair of sheets or plates 10 and 11 of aluminum, copper or other non-ferrous ductile metal or alloy capable of being cold pressure welded. In order to join the aligned edges of the sheets 10 and 11 by cold pressure welding, there are provided a pair of pressure tools or dies 12 and 13 forming part of a suitable pressure applying means such as a hand press, hydraulic press, etc., to apply a pressure to the pieces 10 and 11 in opposite directions as indicated by the arrows a. The pressure is applied to a parallel strip-like area spaced from the edges of the sheets 10 and 11, to leave projecting portions or flanges 10' or 11', respectively. The tools 12 and 13 are provided with chamfered pressure surfaces 12a and 12b tapering in a direction towards the edges of the sheets 10 and 11 and including an angle α, as shown in the drawing.

Figure 2:
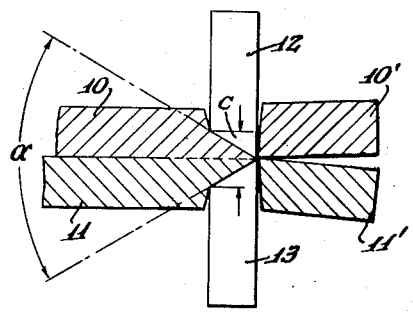
Figure 2 shows the tools and sheets of Figure 1 with the weld being completed.

In an arrangement of this type, as the tools 12 and 13 are pressed against the sheets 10 and 11, the area of contact will at first be limited to the outer edges of the tools and will increase gradually and linearly as the tools approach each other until reaching the final position with the outer edges of the tool surfaces 12a and 12b abutting against each other, as shown in Figure 2. After a certain distance has been reached between the outer edges of the surfaces 12a and 12b, a flowing together or welding of the metals takes place at a limited area opposite to the edges of said surfaces, whereupon, with continued closing of the tools 12 and 13, the welding increases or spreads progressively in an inward direction, as indicated by the arrows b, until the complete pressed area under the tools have been welded in the final position shown in Figure 2.

As is understood, the surface areas of the sheets 10 and 11 to be joined are sufficiently cleaned prior to the welding operation, preferably by scratch-brushing by means of a rotary scratch-brush consisting of wires of a given diameter and rotating at a sufficiently high speed, to provide metallic surfaces substantially uncontaminated by matter foreign to the metals, whereby to enable a cold flow of the metal of one surface into intimate contact with the adjoining surface and to produce a solid phase cold weld bond over the entire area compressed by the tools 12 and 13. The length of the welding strip may have any value depending on the dimensions of the pieces to be welded, but should be at least 5 times the width $w$ in order to insure satisfactory results.

If tools with welding surfaces were used which are parallel to the sheets 10 and 11 as disclosed by known cold welding processes, the tools must be pressed into the metal surfaces until reaching a predetermined and critical depth or partial reduction in thickness of the pieces being welded, at which time welding takes place simultaneously over substantially the entire pressed surfaces. When using chamfered tools, on the other hand, according to the present invention, the weld is gradually built up from a narrow or linear strip, at the outer edge of the welding area, increasing progressively and continuously until covering the entire welding area. This results in a substantially V-shaped weld of reduced height by simultaneously shearing or parting off of excess material, in the manner described and understood.

In order to achieve optimum results, the chamfer angle $\alpha$ should have a definite value for materials of a given characteristic such as ductility or hardness, in order to insure a continuous spread of the weld from one edge to the other of the welding area or strip, substantially without any interruption. For the same reason, the tapering surfaces 12a and 12b should be substantially flat, at least over the width $w$ of the welding area or strip as shown in the drawing. For commercially pure aluminum, it has been found that the width $w$ or "height of chamfer" of the dies 12 and 13 should be about .6 to .7 of the gauge thickness $t$ of the sheets or plates 10 and 11, while the angle $\alpha$ should be of the order from 40 to 50°. These values, however, are not critical and may vary substantially for materials having different characteristics, such as ductility, hardness, etc. The optimum values can be easily determined by practical experiment.

In the arrangement described, the tools 12 and 13 are so designed as to shear or part off the excess material or projecting flanges 10' and 11' as shown in Figure 2. However, it is possible to effect a weld of this type without causing the inner ends of the dies to touch or shearing off the excess material. In producing a weld according to the invention, the flow of the metal at welding is in a substantially inward direction parallel to the meeting surfaces or interface as shown by the arrows $b$, although some of the material, at least during the initial stages of welding, will flow outwardly and be removed by the shearing or parting off of the edge portions or flanges 10' and 11'.

In known methods of cold welding using dies with pressure surfaces parallel to the interface of sheets 10 and 11, the width $w$ of the dies is advantageously chosen of the order of the gauge thickness $t$ and the dies are pressed into the material to an extent to effect a predetermined percentage reduction of the total thickness T of the sheets or pieces being welded, this reduction being about 70% in case of commercially pure aluminum and 86% for copper.

In effecting a weld of the type shown in Figures 1 and 2 according to the present invention, a further practical rule for the angle $\alpha$ has been found by the base $c$, Figure 2, of the V-shaped weld or triangle included by the surfaces 12a and 12b in the final welding position, being about 30% of the total work thickness T. This value corresponds to the design of the die width or height of chamfer $w$ and chamfer angle $\alpha$ as given above.

Figure 3:
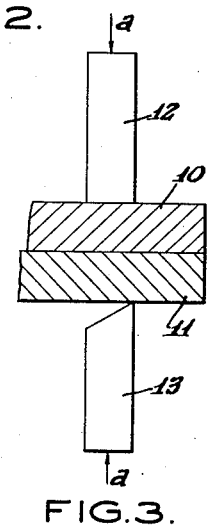
Figure 3 illustrates a modification of Figure 1.

In place of using a pair of chamfered tools as shown in Figures 1 and 2, only one of the tools may be chamfered, as indicated in Figure 3 showing a tool 12 with a pressure surface parallel to the sheets 10 and 11 and a cooperating tool 13 having a chamfered surface in accordance with the invention.

Figure 4:
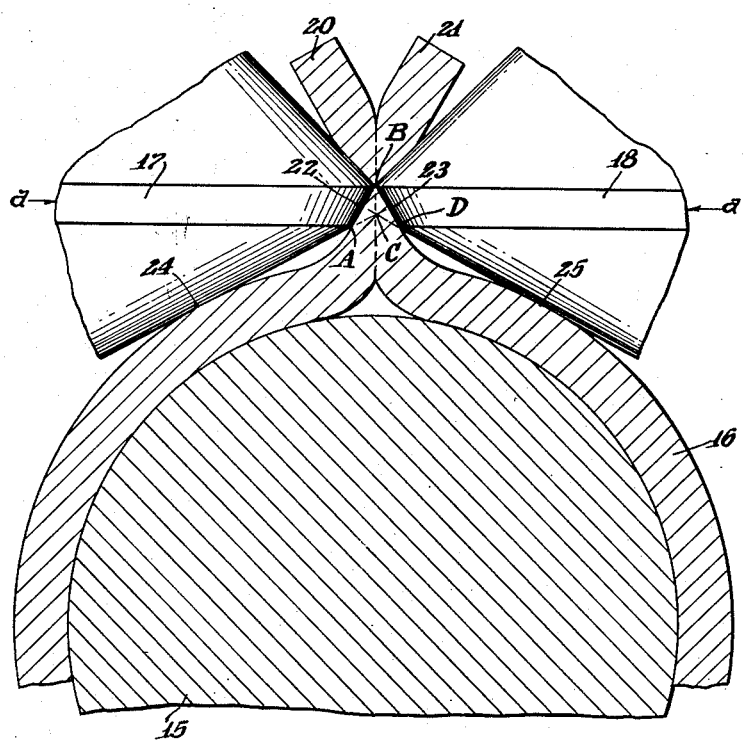
Figure 4 shows a device for welding tubular members produced from strip metal by means of welding rollers constructed in accordance with the principles of the invention.

Referring to Figure 4, there is shown, by way of example, a construction of welding rolls for a machine for producing metal tubes, such as for sheathing a cable or insulated electric conductors with commercial purity aluminum in accordance with the invention.

The cable shown comprises a core 15 which may have any number of conductors suitably insulated and an outer sheath 16 of commercial purity aluminum of 18 S. W. G. (.048") formed around the core by rolls (not shown) in the machine, such as described with above-mentioned co-pending application. These forming rolls are provided ahead of the welding rolls 17 and 18 and serve to bend the sheath 16 into the required shape from metal strip of the necessary width to provide flanges 20 and 21 to be welded together, the flanges before welding projecting radially away from the centre of the core 15. The outside diameter of the sheath 16 is 0.576" and the flange height before welding is such that there is excess metal laterally outwards of the frusto-conical welding surfaces 22 and 23 of the rolls 17 and 18, respectively. Thus, the flange height from the point A may be as much as 0.05". In the construction shown, the width of the surfaces 22 and 23, measured axially, is about 0.03", the sheath 16 being 0.048" thick. The axial width of the surfaces 22 and 23 may be termed the "height of chamfer."

As will be clearly seen from the drawing the actual welding surfaces 22 and 23 of the welding rolls 17 and 18, are, as it were, chamfered and the peripheries of the welding rolls meet or practically meet at a point B away from the cable center, to provide a V-shaped forming pass for the contacting flanges or other parts run therethrough and to progressively apply a force thereto to effect an incremental reduction of the total metal thickness of said flanges varying from the inner wider part to the apex of the V in the manner described above. As the flanges 20 and 21 pass through the rolls 17 and 18, so they are welded together, some metal flowing radially inwardly towards the center of the cable and some, at least initially, radially outwards, the meeting peripheries shearing off any excess metal.

In the example given, the angle between the welding surfaces 22 and 23 at the place of welding is 44° but, naturally, this angle will vary with welding requirements.

The height of chamfer, as defined above, is usually a compromise between the finished welded flange height required by practical considerations and the strength of the weld required and in the rolls shown is about 70% of the thickness of the sheath 16.

Generally, the height of chamber will not be larger than the material thickness. The angle of a welding surface 22 or 23 is determined by the weldability of the material and it is recommended that the distance A—D or base of the isosceles triangle formed by the surfaces 22 and 23 at that plane furthest from the point B, corresponding to the base C of Figure 2, that is the maximum gap between the surfaces, should be equal to the theoretical final thickness required to weld with parallel flat tools each having a width, in the direction of flow of metal at welding, equal to the material thickness. This rule has been applied to 99.5% purity aluminum (commercial purity aluminum) with satisfactory results (being about 30% of the total thickness of the sheets 10 and 11) and the gap would naturally be larger for this material than say 99.3% purity aluminum which is of lower weldability.

In the rolls 17 and 18 shown in the drawing, the distance from the true periphery of the sheath 16 to the point C, the imaginary intersection of the surfaces 24 and 25 of the rolls 17 and 18, is made 0.035" to allow metal to be displaced radially inwardly at welding. The sheath form before welding and its position in regard to the rolls are chosen to meet this requirement.

In the foregoing, the invention has been described with reference to a few specific illustrative devices. It will be apparent, however, that many variations and modifications as well as the substitution of equivalent elements and steps for those herein described, may be made without departing from the broader scope and spirit of the invention as set forth in the appended claims. The specification and drawing are accordingly to be regarded in an illustrative rather than in a limiting sense.

I claim:
1. A method of making a weld along the edges of a pair of ductile metal parts comprising cleaning the areas of contact to be joined to produce pure metallic surfaces, placing said parts with their cleaned areas in contacting relation and running the parts past a V-shaped forming pass with the widest part of the V inwardly of said edges, to progressively apply a force to deform said parts over an area having a maximum width of the order of the thickness of one of said parts and being substantially parallel to the edges of said parts, to effect a progressive reduction of the total metal thickness of said parts varying across the width of said area from a minimum of at least 70% at the inner edge to a maximum approaching the total thickness of said parts at the outer edge of said area, to thereby cause the metal of the adjoining surfaces at said area to cold flow into a V-shaped solid phase cold weld joint connecting said parts along said edges.

2. A method of making a weld along the edges of a pair of aluminum parts comprising cleaning the areas of contact to be joined to produce pure metallic surfaces, placing said parts with their cleaned areas in contacting relation and running the parts past a V-shaped forming pass with the widest part of the V inwardly of said edges, to progressively apply a force to deform said parts over an area having a width of about 70% of the gauge thickness of one of said parts and being substantially parallel to the edges of said parts, to effect a progressive reduction of the total metal thickness of said parts varying across the width of said area from a minimum of about 70% at the inner edge to a maximum approaching the total thickness of said parts at the outer edge of said area, to thereby cause the metal of the adjoining surfaces at said area to cold flow into a V-shaped solid phase cold weld joint connecting said parts along said edges.

3. A method of making a weld along the edges of a pair of ductile metal parts comprising cleaning the areas of contact to be joined to produce pure metallic surfaces, placing said parts with their cleaned areas in contacting relation and running the parts past a V-shaped forming pass with the widest part of the V inwardly of said edges, to progressively apply a force to deform said parts over an area having a maximum width of the order of the thickness of one of said parts and being substantially parallel to the edges of said parts, to effect a progressive reduction of the total metal thickness of said parts varying across said area from a minimum of at least 70% at the inner edge to a maximum equal to the total thickness of said parts at the outer edge of said area, to thereby part off excess metal beyond the outer edge of said area and to cause the metal of the adjoining surfaces at said area to cold flow into a V-shaped solid phase cold weld joint connecting said parts along said edges.

4. In a method of fabricating tubes of ductile metal which comprises bending a metal sheet into tubular shape with two radial meeting flanges running longitudinally along the tube and making a weld along the edges of said flanges comprising cleaning the areas of contact to be joined to produce pure metallic surfaces and running the contacting flanges past a V-shaped forming pass with the widest part of the V inwardly of said edges, to progressively apply a force to deform said flanges over an area having a maximum width of the order of the thickness of one of said flanges and substantially parallel to said edges, to effect a progressive reduction of the total thickness of said flanges at said area varying across the width thereof from a minimum of at least 70% at the inner edge to a maximum approaching the total thickness of said flanges at the outer edge of said area, to thereby cause the metal of the adjoining surfaces at said area to cold flow into a V-shaped solid phase cold weld joint connecting said flanges along said edges.

References Cited in the file of this patent

UNITED STATES PATENTS

| Number | Name | Date |
|---|---|---|
| 1,617,511 | Balch | Feb. 15, 1927 |
| 1,951,529 | Possnett | Mar. 20, 1934 |
| 2,109,921 | Leach | Mar. 1, 1938 |
| 2,427,597 | Garner et al. | Sept. 16, 1947 |
| 2,522,408 | Sowter | Sept. 12, 1950 |
| 2,560,678 | Wirt | July 17, 1951 |

FOREIGN PATENTS

| Number | Country | Date |
|---|---|---|
| 208,331 | Great Britain | Dec. 20, 1923 |

OTHER REFERENCES

The Engineer, pages 432–433, April 30, 1948.
Welding Research, pages 94r–108r, October 1948.